United States Patent
Lee et al.

(10) Patent No.: US 8,243,579 B2
(45) Date of Patent: *Aug. 14, 2012

(54) OFDM RECEIVING CIRCUIT HAVING MULTIPLE DEMODULATION PATHS USING OVERSAMPLING ANALOG-TO-DIGITAL CONVERTER

(75) Inventors: Seung-Wook Lee, Seoul (KR); Joonbae Park, Seoul (KR); Jeong Woo Lee, Seoul (KR); Su Won Kang, Seoul (KR); Kyeongho Lee, Seoul (KR)

(73) Assignee: GCT Semiconductor, Inc., San Jose, CA (US)

( * ) Notice: Subject to any disclaimer, the term of this patent is extended or adjusted under 35 U.S.C. 154(b) by 112 days.

This patent is subject to a terminal disclaimer.

(21) Appl. No.: 11/976,909

(22) Filed: Oct. 29, 2007

(65) Prior Publication Data
US 2008/0253277 A1 Oct. 16, 2008

(30) Foreign Application Priority Data
Oct. 30, 2006 (KR) .................. 10-2006-0105471

(51) Int. Cl.
*H04J 11/00* (2006.01)
(52) U.S. Cl. ....................... 370/203; 375/349
(58) Field of Classification Search .............. 370/203, 370/204, 278, 332; 375/259, 267, 349
See application file for complete search history.

(56) References Cited

U.S. PATENT DOCUMENTS

| | | | |
|---|---|---|---|
| 6,005,506 A | 12/1999 | Bazarjani et al. | |
| 7,280,810 B2 * | 10/2007 | Feher | 455/137 |
| 7,706,766 B2 | 4/2010 | Vavelidis et al. | |
| 2002/0136276 A1 | 9/2002 | Franceschini et al. | |
| 2003/0123383 A1 | 7/2003 | Korobkov et al. | |
| 2005/0020298 A1 | 1/2005 | Masumoto et al. | |
| 2005/0119025 A1 | 6/2005 | Mohindra et al. | |
| 2006/0061501 A1 | 3/2006 | Sheng et al. | |
| 2006/0078072 A1 * | 4/2006 | Cheon et al. | 375/326 |
| 2006/0256884 A1 * | 11/2006 | Tomioka et al. | 375/260 |
| 2006/0274838 A1 * | 12/2006 | Feher | 375/259 |
| 2006/0274867 A1 * | 12/2006 | Nagata et al. | 375/347 |
| 2008/0026717 A1 * | 1/2008 | Huynh | 455/266 |
| 2008/0043818 A1 * | 2/2008 | Tal et al. | 375/135 |
| 2008/0261650 A1 * | 10/2008 | Piriyapoksombut et al. | 455/552.1 |
| 2008/0267312 A1 * | 10/2008 | Yokoyama | 375/267 |
| 2008/0297414 A1 * | 12/2008 | Krishnaswamy et al. | 342/368 |

FOREIGN PATENT DOCUMENTS

| | | |
|---|---|---|
| CN | 1281597 | 1/2001 |
| CN | 1574663 | 2/2005 |
| WO | WO 2005/036848 A1 | 4/2005 |

OTHER PUBLICATIONS

Won Namgoong, "A Channelized Digital Ultrawideband Receiver," University of Southern California, May 2003, IEEE.

* cited by examiner

*Primary Examiner* — Michael Thier
*Assistant Examiner* — Awet Haile
(74) *Attorney, Agent, or Firm* — Muir Patent Consulting, PLLC

(57) ABSTRACT

Embodiments according to the application relates to an OFDM (orthogonal frequency division multiplexing) receiving circuit and methods thereof configured to have a plurality of demodulation paths for an oversampling ADC, which can increase or improve an overall performance of the circuit.

10 Claims, 8 Drawing Sheets though the ADC 19 is divided into an I channel ADC and a Q channel ADC, the I channel ADC and the Q channel ADC are regarded as the single ADC 19 for convenience) and the single demodulator 21 for an OFDM signal band. For example, in the Wibro standard, the single filter 17, the single ADC 19 and the single demodulator 21 are used for an OFDM signal having a bandwidth of 8.75 MHz including 841 sub-carriers. In this case, the nyquist rate ADC 19 has a sampling frequency of 10 MHz.

FIG. 2 is a diagram illustrating a received signal after passing through the down-conversion mixer 13 of the conventional OFDM receiving circuit of FIG. 1. In FIG. 2, a band between $+F_B$ and $-F_B$ corresponds to the OFDM signal band. In accordance with the Wibro standard, $+F_B$ corresponds to 4.375 MHz. In addition, a frequency response of the filter 17 when the nyquist rate ADC 19 is used is shown in FIG. 2.

On the other hand, it is generally known that a performance of the ADC can be improved when an oversampling is carried out. When the oversampling is carried out, an SNR (signal-to-noise ratio) within the frequency band (between $+F_B$ and $-F_B$) may be expressed as equation 1.

$$SNR_{dB}=10 \log(12*P_S/V_{FS}^2)+6N+10 \log(OSR) \qquad [\text{Equation 1}]$$

where $P_S$ denotes a power of an input signal, $V_{FS}$ denotes a dynamic range of an entirety of the input signal, N denotes a number of quantization bits, and OSR denotes an oversampling ratio wherein OSR corresponds to $(F_S/2)/F_B$ when a sampling frequency is FS.

As expressed in equation 3, when OSR is doubled, a performance improvement of 3 dB is obtained, which equivalently provides an increase of 0.5 bits in a resolution. That is, a principle of the oversampling ADC is that increasing the sampling frequency, which equivalently increases the number of bits obtained by the ADC, reduces a power of a quantization noise.

However, since the OFDM compliant to the Wibro standard has the signal band of 8.75 MHz, a sampling frequency much higher than that of the CDMA compliant to IS95 standard having a signal band of 1.25 MHz is required in order to carry out the oversampling. For instance, when the OSR is 8, the sampling frequency $F_S$ of the ADC should be 70 MHz (=8*8.75 MHz). Moreover, in order to increase the OSR for an improvement of the system performance, the sampling frequency $F_S$ increasing proportional to the OSR is required. However, when the sampling frequency increases, an aperture error and an error by a clock jitter increase, which limits the increase of the sampling frequency. Therefore, it is difficult to apply the oversampling ADC to the OFDM receiving circuit of FIG. 1. Even when the oversampling ADC is applied, it is difficult to increase the OSR (e.g., to have a value of more than 8).

The above references are incorporated by reference herein where appropriate for appropriate teachings of additional or alternative details, features and/or technical background.

SUMMARY OF THE INVENTION

An object of the present general inventive concept is to solve at least the above problems and/or disadvantages or to provide at least the advantages and/or utilities described hereinafter in whole or in part.

Another object of the application to provide an OFDM receiver that can overcome a correlation between a sampling frequency and an OSR to increase the OSR without greatly increasing the sampling frequency, which can improve a performance of an oversampling ADC and/or improve an overall performance of the ODFM receiver.

To achieve objects and/or utilities of embodiments of the application in whole or in part there is provided an OFDM receiving circuit that can include a low noise amplifier for subjecting a received OFDM signal to an amplification, a down-conversion mixer for down-converting an output signal of the low noise amplifier, a plurality of demodulation paths for receiving the OFDM signal being outputted from the down-conversion mixer, and for outputting a plurality of data, wherein a band of the OFDM signal being outputted from the down-conversion mixer is divided into a plurality of bands, each of the plurality of bands including a plurality of sub-carriers, and each of the plurality of demodulation paths outputs a data of the plurality of data obtained by subjecting a signal in one of the plurality of bands corresponding to each of the plurality of demodulation paths to an oversampled digital conversion, a digital filtering and demodulation and a combiner for combining the plurality of data being outputted from the plurality of demodulation paths.

To also achieve objects and/or utilities of embodiments of the application in whole or in part, there is provided an OFDM receiving circuit including a low noise amplifier for subjecting a received OFDM signal to an amplification, a down-conversion mixer for down-converting an output signal of the low noise amplifier, a plurality of demodulation paths for receiving the OFDM signal being outputted from the down-conversion mixer, and for outputting a plurality of data, wherein a band of the OFDM signal being outputted from the down-conversion mixer is divided into a plurality of bands, each of the plurality of bands including a plurality of sub-carriers, and the plurality of demodulation paths include at least one first demodulation path and at least one second demodulation path and a combiner for combining the plurality of data being outputted from the plurality of demodulation paths, wherein the first demodulating path can include an oversampling ADC for subjecting the OFDM signal being outputted from the down-conversion mixer to a digital conversion, a digital filter for passing through a signal of an output signal of the oversampling ADC in a band corresponding to the first demodulation path, and a first demodulator for demodulating an output of the digital filter to obtain one of the plurality of data corresponding to the first demodulating path, and the second demodulating path comprises an analog filter for passing through a signal of the OFDM signal being outputted from the down-conversion mixer in a band corresponding to the second demodulation path, a nyquist rate ADC subjecting an output signal of the analog filter to a digital conversion and a second demodulator for demodulating an output of the nyquist rate ADC to obtain one of the plurality of data corresponding to the second demodulating path.

To also achieve objects and/or utilities of embodiments of the application in whole or in part, there is provided an OFDM receiving method that can include (a) subjecting an received OFDM signal to an amplification, (b) down-converting the amplified OFDM signal using a mixer, (c) obtaining a plurality of first digital signals from the down-converted OFDM signal, wherein a band of the down-converted OFDM signal is divided into a plurality of bands, and each of the plurality of first digital signals is obtained by subjecting a signal in one of the plurality of bands corresponding to each of the plurality of first digital signals to an oversampled digital conversion, (d) subjecting the plurality of first digital signals to a digital filtering to obtain a plurality of second digital signals and (e) demodulating the plurality of second digital signals to obtain a plurality of data.

To also achieve objects and/or utilities of embodiments of the application in whole or in part, there is provided an OFDM receiving circuit that can include a low noise amplifier to amplify a received OFDM signal, a plurality of demodulation paths to receive an output signal of the low noise amplifier and to output a plurality of data, wherein a band of the OFDM signal comprises a plurality of bands each to include a plurality of sub-carriers, and each of the plurality of demodulation paths to subject a down-converted OFDM signal from the low noise amplifier in a corresponding one of the plurality of bands to an oversampled digital conversion, a digital filtering and a demodulation to output data of the plurality of data and a combiner to combine the plurality of data being outputted from the plurality of demodulation paths.

To also achieve objects and/or utilities of embodiments of the application in whole or in part, there is provided an OFDM receiving circuit that can include a low noise amplifier to amplify a received OFDM signal, a plurality of demodulation paths to receive the OFDM signal from the low noise amplifier and to output a plurality of data, wherein a band of the OFDM signal is divided into a plurality of bands, each of the plurality of bands is configured to include a plurality of sub-carriers, and the plurality of demodulation paths comprises at least one first demodulation path to process a first band of the plurality of bands and at least one second demodulation path to process a second band of the plurality of bands different from the first band and a combiner to combine the plurality of data from the plurality of demodulation paths.

To also achieve objects and/or utilities of embodiments of the application in whole or in part, there is provided an OFDM receiving method that can include amplifying an received OFDM signal, obtaining a plurality of first digital signals from the amplified OFDM signal, wherein a band of the OFDM signal is divided into a plurality of bands, each of the plurality of bands including a plurality of sub-carriers, and each of the plurality of first digital signals is obtained by down-converting the amplified OFDM signal and subjecting a signal of the down-converted OFDM signal in one of the plurality of bands corresponding to each of the plurality of first digital signals to an oversampled digital conversion, digital filtering the plurality of first digital signals to obtain a plurality of second digital signals and demodulating the plurality of second digital signals to obtain a plurality of data.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF EMBODIMENTS

Exemplary embodiments according to the present general inventive concept will now be described in detail with reference to the accompanied drawings. The interpretations of the terms and wordings used in description and claims should not be limited to common or literal meanings. Exemplary embodiments of the present general inventive concept are provided to describe the application more thoroughly for those skilled in the art.

Figure 3:
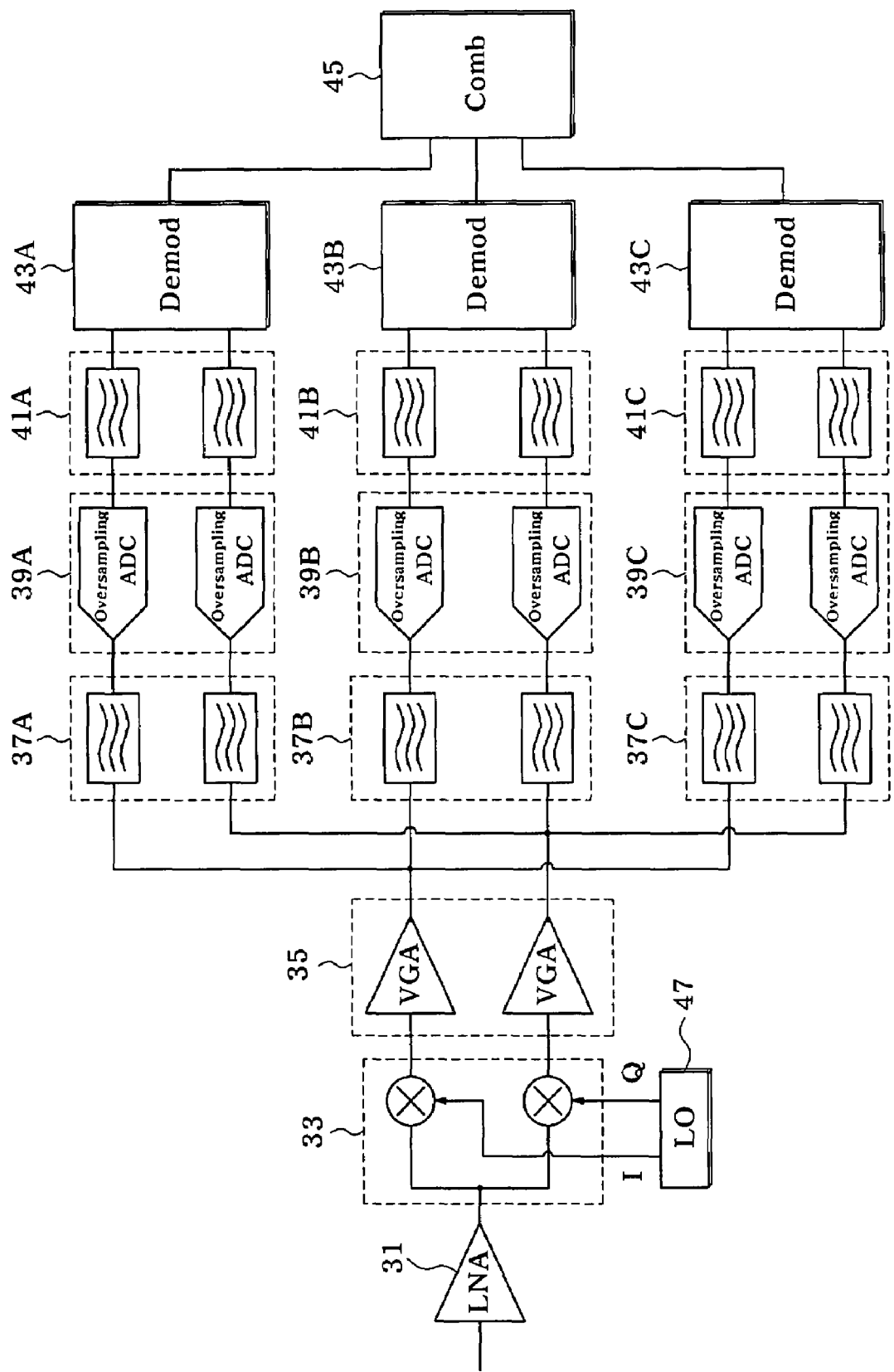
FIG. 3 is a diagram illustrating an OFDM receiving circuit in accordance with a first embodiment according to the application having three modulation paths and an oversampling ADC.

FIG. 3 is a diagram illustrating an OFDM receiving circuit in accordance with a first embodiment of the application. As illustrated in FIG. 3, the OFDM receiving circuit is configured to have three modulation paths and an oversampling ADC.

As shown in FIG. 3, the OFDM receiving circuit can include a low noise amplifier 31, a down-conversion mixer 33, a variable gain amplifier 35, a plurality of analog filters 37A, 37B and 37C, a plurality of oversampling ADCs 39A, 39B and 39C, a plurality of digital filters 41A, 41B and 41C, a plurality of demodulators 43A, 43B and 43C, a combiner 45 and a local oscillator 47. The OFDM receiving circuit shown includes three demodulation paths. However, embodiments of the application are not intended to be limited by such an exemplary disclosure. A first demodulation path of the three demodulation paths can include the first analog filter 37A, the first oversampling ADC 39A, the first digital filter 41A and the first demodulator 43A. A second demodulation path of the three demodulation paths can include the second analog filter 37B, the second oversampling ADC 39B, the second digital filter 41B and the second demodulator 43B, and a third demodulation path of the three demodulation paths can include the third analog filter 37C, the third oversampling ADC 39C, the third digital filter 41C and the third demodulator 43C.

The low noise amplifier 31 subjects a received RF signal to a low noise amplification and transmits the amplified signal to the down-conversion mixer 33. Although not shown, an additional amplifier may be disposed between the low noise amplifier 31 and the down-conversion mixer 33.

The down-conversion mixer 33 down-converts the received RF signal transmitted from the low noise amplifier 31 and outputs the down-converted signal. In order to achieve this, the down-conversion mixer 33 preferably outputs a value obtained by multiplying the received RF signal by an in-phase signal being outputted by the local oscillator 43 and a value obtained by multiplying the received RF signal by an quadrature signal being outputted by the local oscillator 43.

The variable gain amplifier 35, which is a type of an amplifier, amplifies an output signal of the down-conversion mixer 33 and outputs the amplified output signal. The variable gain amplifier 35 may be omitted. In addition, the variable gain amplifier 35 may be disposed between the analog filters 37A, 37B and 37C and the oversampling ADCs 39A, 39B and 39C. For example, since the OFDM receiving circuit shown has the three modulation paths, three variable gain amplifiers may be required. In addition, the variable gain amplifier 35 may be disposed between the down-conversion mixer 33 and the analog filters 37A, 37B and 37C, and/or between the analog filters 37A, 37B and 37C and the oversampling ADCs 39A, 39B and 39C.

Figure 4A:
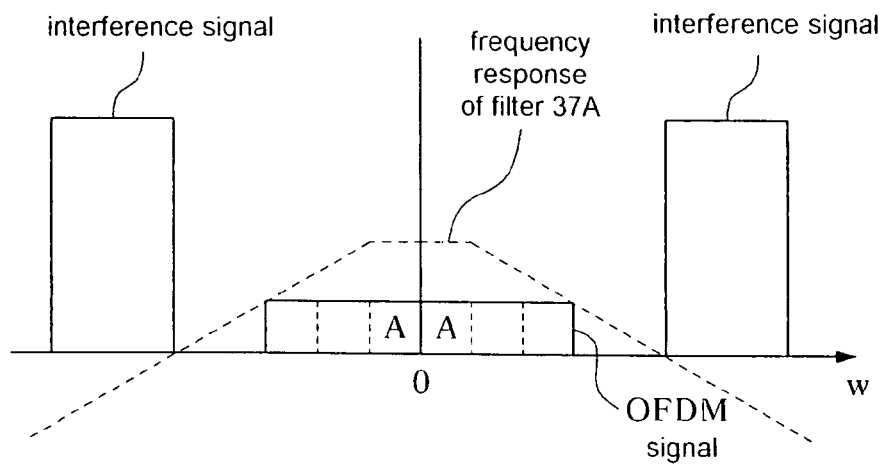
FIG. 4 is a diagram illustrating a frequency response of each of a first analog filter 37A, a second analog filter 37B and a third analog filter 37C.
Figure 4B:
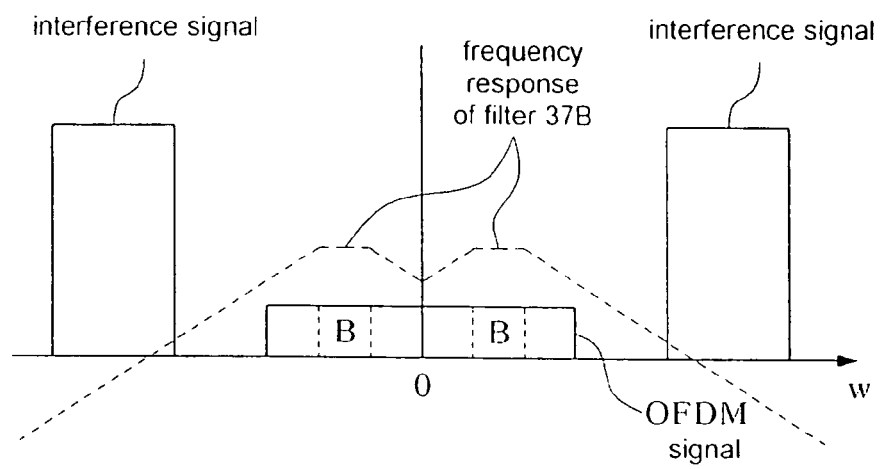
Figure 4C:
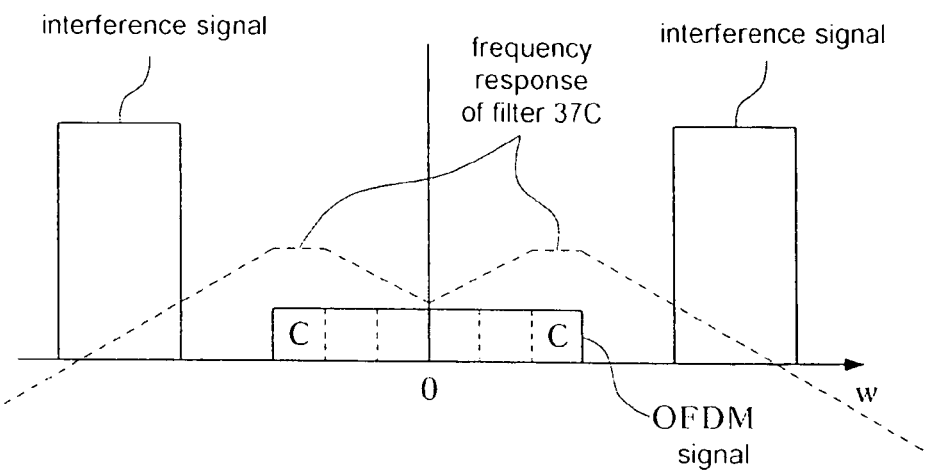

Each of the analog filters 37A, 37B and 37C can selectively output a signal of a predetermined band of the output signal of the variable gain amplifier 35. Frequency responses of the first analog filter 37A, the second analog filter 37B and the third analog filter 37C are shown in FIGS. 4a, 4b and 4c, respectively. As shown in FIG. 4a, the first analog filter 37A can be a low pass filter to selectively output a predetermined number of sub-carriers A having a low frequency from the received OFDM signal (e.g., including a total of 841 sub-carriers). As shown in FIG. 4b, the second analog filter 37B can be a band pass filter to selectively output a predetermined number of sub-carriers B having an intermediate frequency from the received OFDM signal (e.g., including the total of 841 sub-carriers). As shown in FIG. 4c, the third analog filter 37C can be a band pass filter to selectively output a predetermined number of sub-carriers C having a high frequency from the received OFDM signal (e.g., including the total of 841 sub-carriers).

Figure 1:
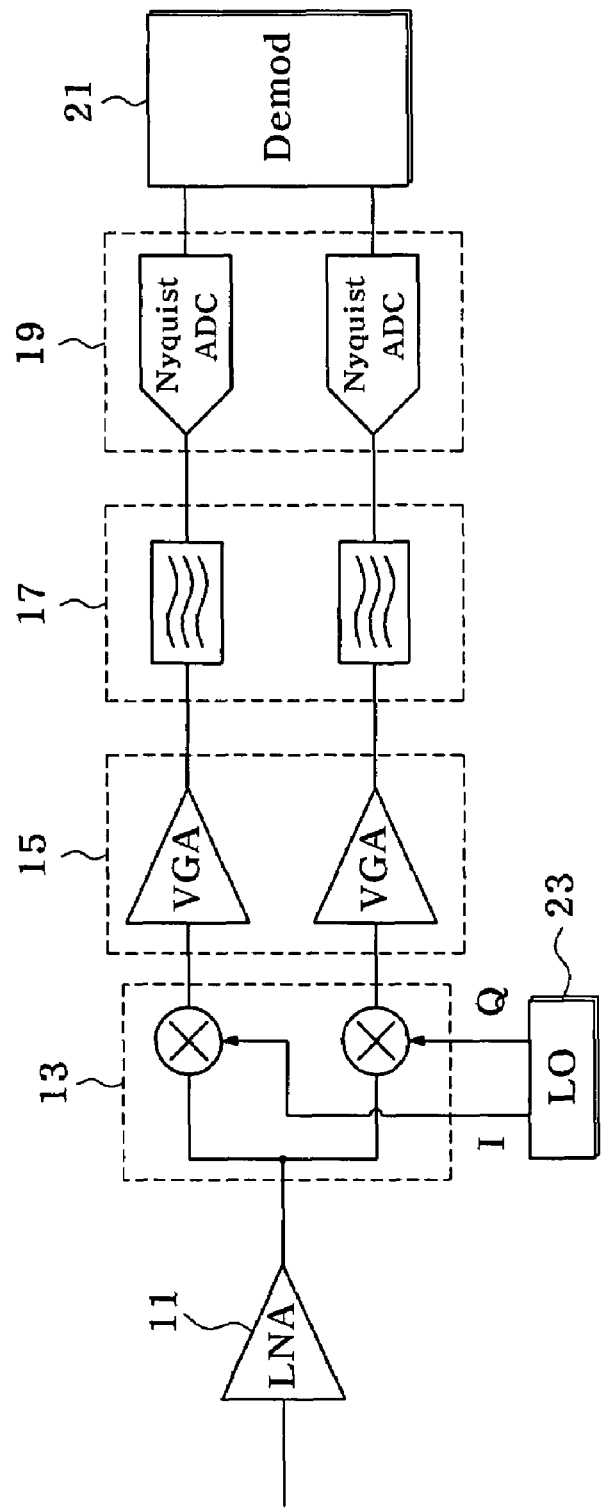
FIG. 1 is a diagram illustrating a conventional OFDM receiving circuit.
Figure 2:
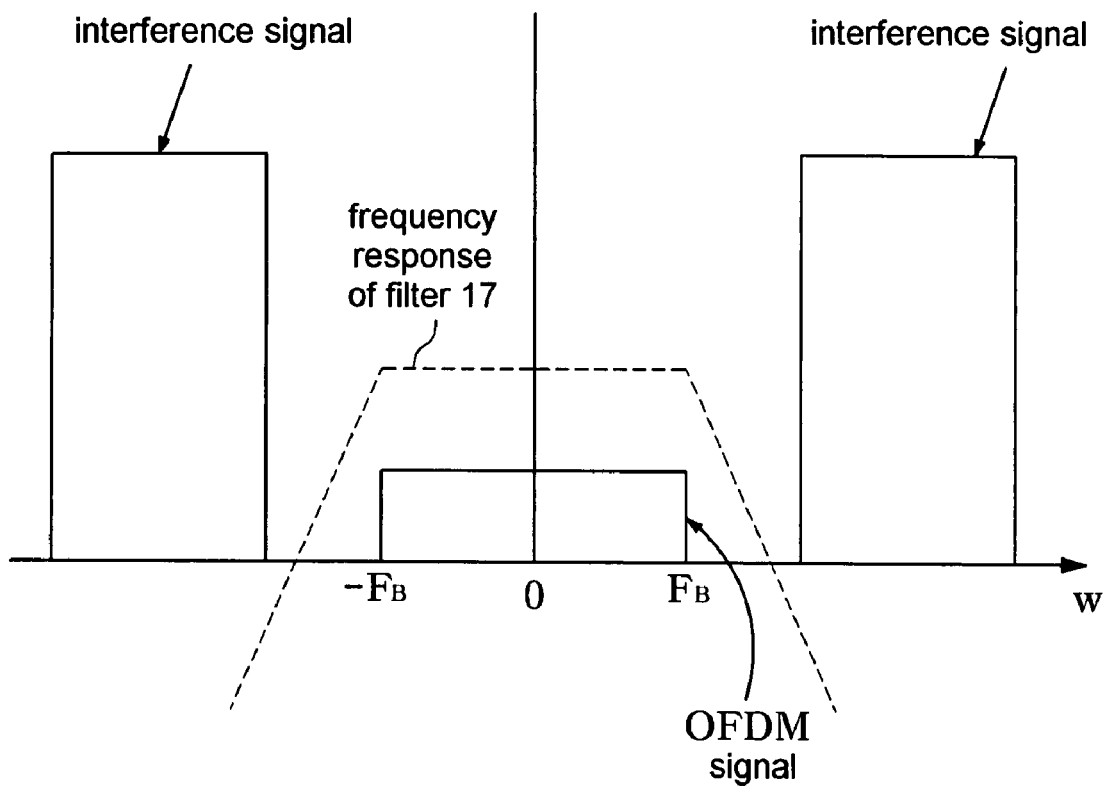
FIG. 2 is a diagram illustrating a received signal after passing through a down-conversion mixer of the conventional OFDM receiving circuit of FIG. 1.

Since the analog filter 17 shown in FIGS. 1 and 2 carries out an anti-aliasing function and a channel selecting function (e.g., a function of removing a signal in a band other than a desired OFDM signal, i.e. an interference signal), a gain of the analog filter 17 should be rapidly reduced outside a pass band (between $-F_B$ and $+F_B$). In order to satisfy such frequency characteristic, the analog filter 17 should be an active RC filter. Since the active RC filter includes an operational amplifier, the active RC filter occupies a considerably large area. Contrarily, it is sufficient for the plurality of analog filters 37A, 37B and 37C shown in FIGS. 3-4c to carry out only the anti-aliasing function because the plurality of digital filters 41A, 41B and 41C added after the plurality of oversampling ADCs 39A, 39B and 39C can carry out the channel selecting function. It is sufficient for the plurality of analog filters 37A, 37B and 37C to carry out only the anti-aliasing function, and the gain of the plurality of analog filters 37A, 37B and 37C may be slowly decreased outside the pass bands A, B and C since a sampling frequency $F_S$ of the plurality of oversampling ADCs 39A, 39B and 39C is very high or increased. Such a frequency characteristic may be sufficiently satisfied by using a passive RC filter, e.g., a simple RC filter. Since the passive RC filter does not include the operational amplifier, the passive RC filter occupies a small area compared to the active RC filter.

In another embodiment, the plurality of oversampling ADCs 39A, 39B and 39C can pass through a signal in a predetermined band of the input signal in some cases. For example, the plurality of oversampling ADCs 39A, 39B and 39C sometimes may operate as the low pass filter or the band pass filter, and the plurality of analog filters 37A, 37B and 37C may be omitted in such case.

The oversampling ADCs 39A, 39B and 39C convert the input signal to a digital signal. The OSR of the oversampling ADCs 39A, 39B and 39C should be equal to or more than 2. It is preferable that each of the oversampling ADCs 39A, 39B and 39C comprises a sigma-delta ($\Sigma\Delta$) ADC carrying out a noise shaping. Since the sigma-delta ADC carries out the noise shaping for removing a quantization noise, the sigma-delta ADC is advantageous in that the performance of the ADC is improved. In addition, since the sigma-delta ADC can operate as the low pass filter (in case of 39A) or the band pass filter (in case of 39B and 39C), the sigma-delta ADC is advantageous in that the analog filters 37A, 37B and 37C may be omitted.

Since there are three demodulation paths as shown in FIG. 3, a bandwidth of the signal being inputted to each of the oversampling ADCs 39A, 39B and 39C is greatly reduced (e.g., to about ⅓) compared to the conventional art. Therefore, the OSR is increased according to the present general inventive concept since $F_B$ in OSR=$(F_S/2)/F_B$ is reduced, thereby increasing an SNR (e.g., equivalently increasing a resolution).

Each of the digital filters 41A, 41B and 41C can selectively output the signal in the predetermined band of the input signal. For example, the first digital filter 41A selectively outputs the signal having the band corresponding to A of FIG. 4a, the second digital filter 41B selectively outputs the signal having the band corresponding to B of FIG. 4b, and the third digital filter 41C selectively outputs the signal having the band corresponding to C of FIG. 4c. In order to achieve this, it is preferable that the first digital filter 41A is the low pass filter, and the second digital filter 41B and the third digital filter 41C are the band pass filter, respectively.

When the passive RC filter is used as the analog filters 37A, 37B and 37C, an output of the oversampling ADCs 39A, 39B and 39C can include a large amount of an interference signal due to a channel selectivity of a poor quality of the analog filters 37A, 37B and 37C. The digital filters 41A, 41B and 41C can remove or reduce the interference signal to improve the channel selectivity. In addition, in case of the sigma-delta ADC, a quantization noise signal included in an output signal of the sigma-delta ADC is frequency-distorted to have a small spectrum in a desired frequency band and a large spectrum in other frequency bands. Therefore, the digital filters 41A, 41B and 41C can reduce or remove the signal in a band other than the desired band (e.g., including the noise signal) to improve the performance of the oversampling ADCs 39A, 39B and 39C.

The demodulators 43A, 43B and 43C respectively receive the signals being outputted from the digital filters 41A, 41B and 41C and carry out a demodulation. The demodulator 43 can carry out a FFT (fast Fourier transform) to extract a data included in the sub-carriers being inputted thereto, and transmit the extracted data to the combiner 45. For example, the first demodulator 43A can receive the predetermined number of the sub-carriers A having the low frequency of the OFDM signal (e.g., having the total of 841 sub-carriers), and transmit the data obtained by the demodulation to the combiner 45. The second demodulator 43B can receive the predetermined number of the sub-carriers B having the intermediate frequency of the OFDM signal (e.g., having the total of 841 sub-carriers), and transmit the data obtained by the demodulation to the combiner 45. The third demodulator 43C can receive the predetermined number of the sub-carriers C having the high frequency of the OFDM signal (e.g., having the total of 841 sub-carriers), and transmit the data obtained by the demodulation to the combiner 45.

The combiner 45 can output a received data for an OFDM signal band obtained by combining the data being outputted from the demodulators 43A, 43B and 43C.

The local oscillator 47 provides the in-phase signal and the quadrature signal to the down-conversion mixer 33.

While the OFDM receiving circuit having the three demodulation paths is described above, two or more demodulation paths are sufficient. For instance, the demodulation paths may be four or more. Further, although the description and claims can refer to "a band of the OFDM signal is divided into a plurality of bands A, B and C", the description and claims are not limited to a case that a sum of the plurality of bands is the band of the OFDM signal. For example, the sum of the plurality of bands A, B and C may be the same as or less than the band of the OFDM signal, the plurality of bands A, B and C may overlap or the like.

The demodulation paths (e.g., first through the third demodulation paths) may demodulate a same number of the sub-carriers or a similar number of the sub-carriers. Each of the demodulation paths may demodulate the sub-carriers the number of that is close to 841/3, for instance, the first, the second and the third demodulation paths may demodulate 260, 260 and 261 sub-carriers, respectively.

In addition, the first through the third demodulation paths may demodulate different numbers of the sub-carriers. In such case, it is preferable that a bandwidth of a band used by one of the demodulation paths is reduced as the interval between the center frequency of the OFDM signal band and the frequency of the band used by the one of the demodulation paths increases. For example, it is preferable that the first demodulation path demodulates a largest number of sub-carriers and the third demodulation path demodulates a smallest number of sub-carriers. For instance, the first, second and third demodulation paths may demodulate 450, 250 and 141 sub-carriers. Exemplary output signals of the down-conversion mixer 33, the first oversampling ADC 39A, the second oversampling ADC 39B and the third oversampling ADC 39C are respectively shown in FIGS. 5a, 5b, 5c and 5d.

Figure 5A:
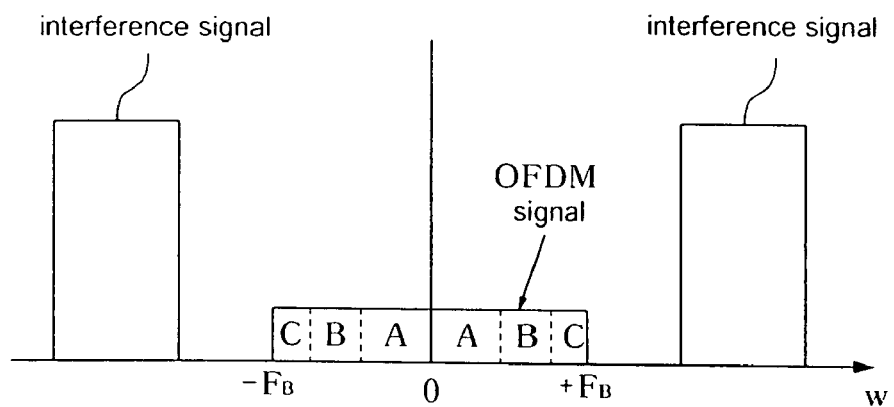
FIG. 5 is a diagram illustrating output signals of a down-conversion mixer 33, a first oversampling ADC 39A, a second oversampling ADC 39B and a third oversampling ADC 39C when a number of selected sub-carriers is reduced as a frequency of a demodulation path increases.
Figure 5B:
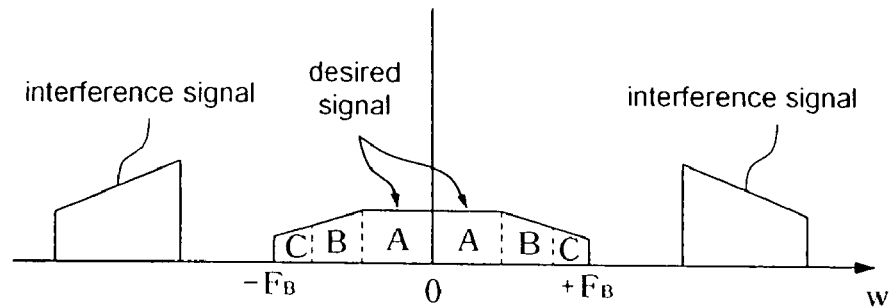
Figure 5C:
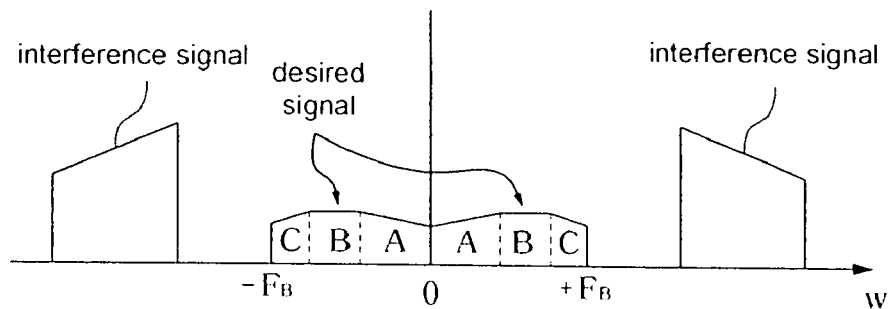
Figure 5D:
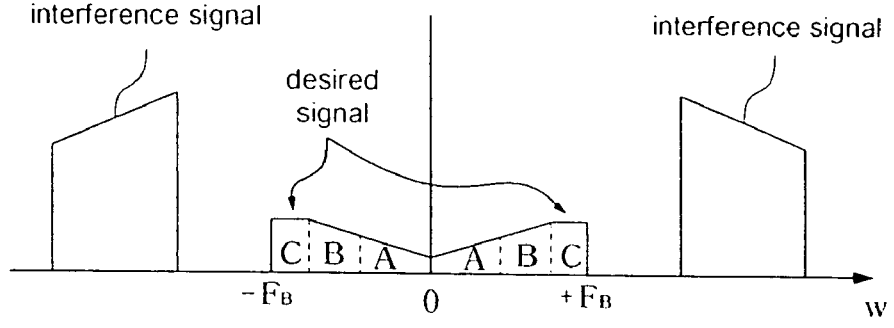

When the output signal of the first oversampling ADC 39A shown in FIG. 5b and the output signal of the third oversampling ADC 39C shown in FIG. 5d are compared, a performance of the first oversampling ADC 39A can be inferior to that of the third oversampling ADC 39C in an aspect of the OSR because the demodulated band A of the first oversampling ADC 39A is wider than the demodulated band C of the third oversampling ADC 39C. In addition, since an interference signal of the first oversampling ADC 39A can be smaller than that of the third oversampling ADC 39C, that is, since a dynamic range $V_{FB}$ of the entirety of the input signal of the first oversampling ADC 39A is smaller than that of the third oversampling ADC 39C, the performance of the first oversampling ADC 39A is superior to that of the third oversampling ADC 39C in an aspect of the dynamic range $V_{FB}$ (e.g., referring to equation 1, the performance is degraded as the dynamic range $V_{FB}$ increases). Therefore, the performance of the first oversampling ADC 39A can be considered substantially similar or equal to that of the third oversampling ADC 39C when the aspects of the OSR and the dynamic range $V_{FB}$ of the entirety of the input signal are considered.

As described above, when a demodulation frequency band is decreased for the demodulation path having a high frequency band, a decrease in the SNR caused by the interference signal that increases as the frequency band of three demodulation path increases can be compensated by the OSR (e.g., decreasing signal band) that preferably increases as the frequency band of thee demodulation path increases to substantially maintain the SNR for the plurality of demodulation paths. Such considerations can improve or increase the overall performance of the OFDM receiving circuit.

Figure 6:
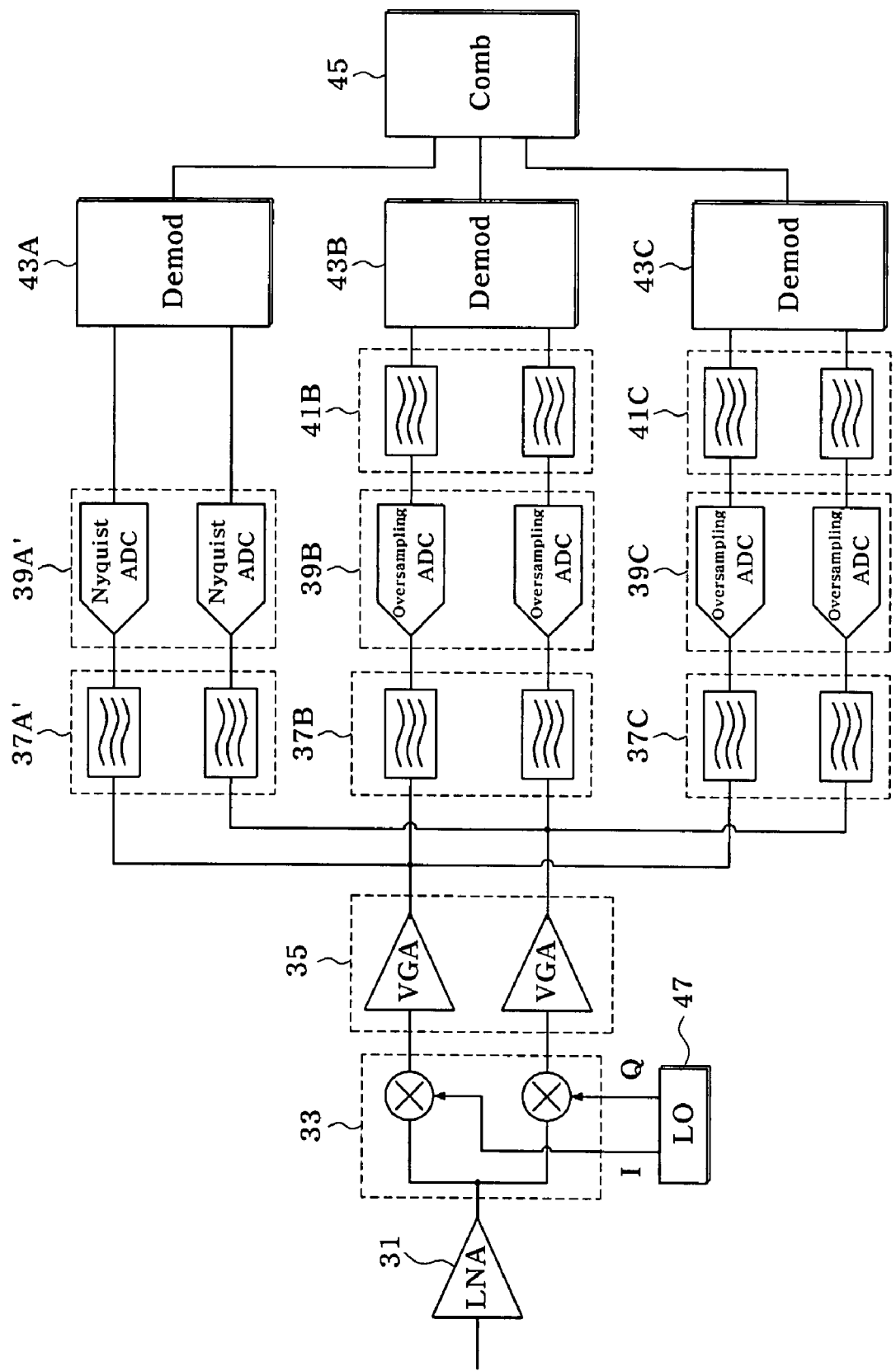
FIG. 6 is a diagram illustrating an OFDM receiving circuit in accordance with a second embodiment according to the application having three modulation paths and a combination of an oversampling ADC and a nyquist rate ADC.

FIG. 6 is a diagram illustrating an OFDM receiving circuit in accordance with a second embodiment according to the application. As shown in FIG. 6, the OFDM receiving circuit can have three modulation paths and a combination of an oversampling ADC and a nyquist rate ADC.

As shown in FIG. 6, second and third demodulation paths of the OFDM receiving circuit in accordance with the second embodiment can use a second oversampling ADC 39B and a third oversampling ADC 39C as described with respect to the first embodiment. An improvement of the performance of the second and third demodulation paths using the second oversampling ADC 39B and the third oversampling ADC 39C are same as above.

A first demodulation path of the OFDM receiving circuit in accordance with the second embodiment preferably uses a nyquist rate ADC 39A'. Therefore, the first demodulation path may not include a digital filter as illustrated in FIG. 6 or may include a digital filter (not shown) contrary to FIG. 6. If the first demodulation path includes the digital filter, an interference signal may be even more reduced or removed. An active RC filter can be used as an analog filter 37A'. A frequency characteristic or a power consumption of the active RC filter 37A' is improved as a pass bandwidth is decreased, and a performance degradation caused by an aperture error and a clock jitter of the nyquist rate ADC 39A' is reduced as a sampling frequency thereof is reduced. Therefore, the first demodulation path using the nyquist rate ADC 39A' also has the improved performance compared to the conventional technology. An OSR of the nyquist rate ADC 39A' can be equal to or more than 1 and less than 2.

While the nyquist rate ADC is used in only the first demodulation path shown in FIG. 6, the demodulation path that uses the nyquist rate ADC according to embodiments of the application is not limited to the first demodulation path having a lowest frequency band.

Figure 7:
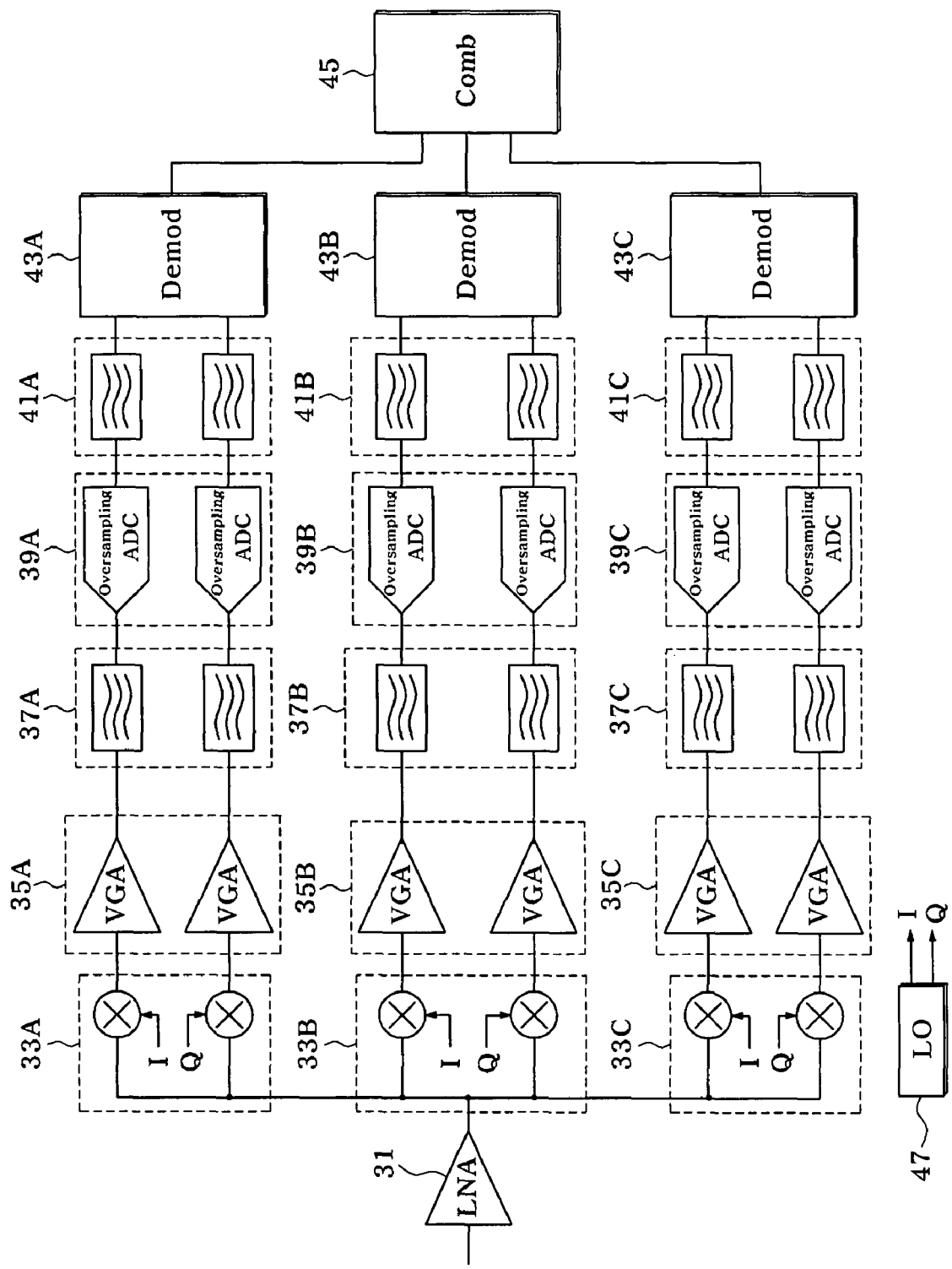
FIG. 7 is a diagram illustrating an OFDM receiving circuit in accordance with a third embodiment according to the application having three modulation paths wherein the demodulation paths start at a down-conversion mixer.

FIG. 7 is a diagram illustrating an OFDM receiving circuit in accordance with a third embodiment of the application. As shown in FIG. 7, the OFDM receiving circuit can have three modulation paths and a demodulation path can start at a down-conversion mixer.

As shown in FIG. 7, the OFDM receiving circuit can include a low noise amplifier 31, down-conversion mixers 33A, 33B and 33C, variable gain amplifiers 35A, 35B and 35C, a plurality of analog filters 37A, 37B and 37C, a plurality of oversampling ADCs 39A, 39B and 39C, a plurality of digital filters 41A, 41B and 41C, a plurality of demodulators 43A, 43B and 43C, a combiner 45 and a local oscillator 47. The OFDM receiving circuit shown in FIG. 7 includes three demodulation paths. A first demodulation path of the three demodulation paths can include the first down-conversion mixer 33A, the first variable gain amplifier 35A, the first analog filter 37A, the first oversampling ADC 39A, the first digital filter 41A and the first demodulator 43A, a second demodulation path of the three demodulation paths comprises the second analog filter 37B, the second oversampling ADC 39B, the second digital filter 41B and the second demodulator 43B, and a third demodulation path of the three demodulation paths comprises the third analog filter 37C, the third oversampling ADC 39C, the third digital filter 41C and the third demodulator 43C.

Since the OFDM receiving circuit shown in FIG. 7 is identical to the OFDM receiving circuit shown in FIG. 3 except that the demodulation path starts at the down-conversion mixers 33A, 33B and 33C, a detailed description of each component of the OFDM receiving circuit shown in FIG. 7 is omitted here.

Figure 8:
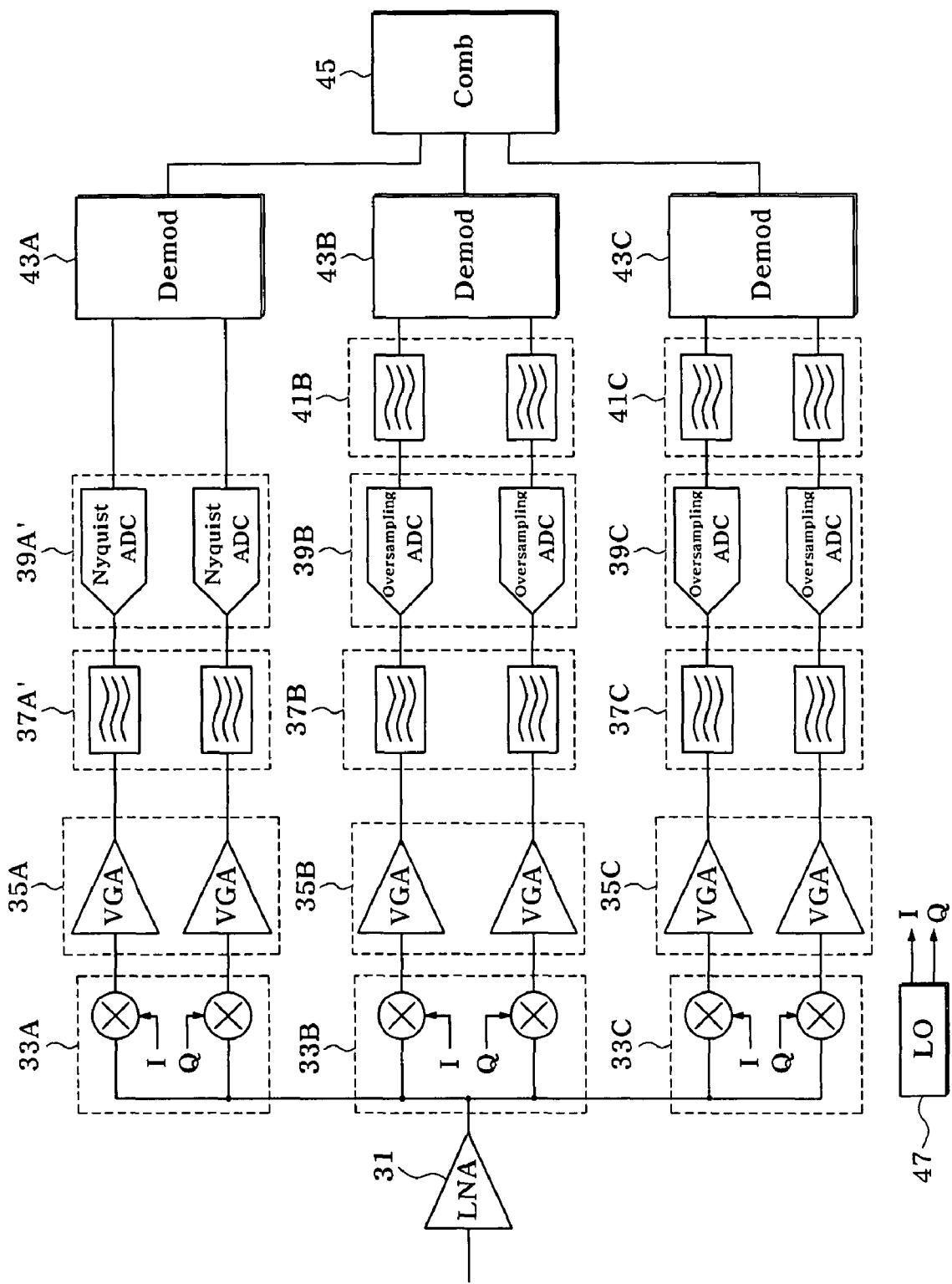
FIG. 8 is a diagram illustrating an OFDM receiving circuit in accordance with a fourth embodiment according to the application having three modulation paths and a combination of an oversampling ADC and a nyquist rate ADC wherein the demodulation paths start at a down-conversion mixer.

FIG. 8 is a diagram illustrating an OFDM receiving circuit in accordance with a fourth embodiment of the application. As shown in FIG. 8, the OFDM receiving circuit can have three modulation paths, a combination of an oversampling ADC and a nyquist rate ADC, and the demodulation path can start at a down-conversion mixer.

Since the OFDM receiving circuit shown in FIG. 8 is identical to the OFDM receiving circuit shown in FIG. 6 except that the demodulation path starts at the down-conversion mixers 33A, 33B and 33C, a detailed description of each component of the OFDM receiving circuit shown in FIG. 8 is omitted here.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

As described above, embodiments of OFDM receiving circuits and methods have various advantages such as the correlation between the sampling frequency and the OSR can be overcome to increase the OSR without greatly increasing the sampling frequency, which can improve a performance of the oversampling ADC and/or the overall performance of the circuit.

Particularly, in accordance with the conventional CDMA, since a CDMA signal is diffused into an entire band, a filtering, a digital conversion and a demodulation cannot be carried out for each frequency. However, in accordance with the application, since the band of the OFDM signal is divided into the plurality of sub-carriers, it is possible to process the OFDM signal by dividing the OFDM signal into the plurality of bands. The present general inventive concept takes advantage of such characteristic of the OFDM signal such that the oversampling can be carried out by dividing the OFDM signal into the plurality of bands, which can improve the performance of an oversampling ADC.

In accordance with embodiments of OFDM receiving circuits of the application, the band of the OFDM signal may be unevenly divided, selectively divided, divided in a predetermined manner or the like and each of the demodulation paths can subject a corresponding divided band to an oversampled digital conversion, a digital filtering and demodulation. Further, bands of an OFDM signal may be unevenly divided and each of the demodulation paths can subject a corresponding one of the divided band to substantially equalize a load of each of the ADCs.

The foregoing embodiments and advantages are merely exemplary and are not to be construed as limiting the application. The present teaching can be readily applied to other types of apparatuses. The description of the application is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures. As used in this disclosure, the term "preferably" is non-exclusive and means "preferably, but not limited to." Terms in the claims should be given their broadest interpretation consistent with the general inventive concept as set forth in this description. For example, the terms "coupled" and "connect" (and derivations thereof) are used to connote both direct and indirect connections/couplings. As another example, "having" and "including", derivatives thereof and similar transitional terms or phrases are used synonymously with "comprising" (i.e., all are considered "open ended" terms)—only the phrases "consisting of" and "consisting essentially of" should be considered as "close ended". Claims are not intended to be interpreted under 112 sixth paragraph unless the phrase "means for" and an associated function appear in a claim and the claim fails to recite sufficient structure to perform such function.

What is claimed is:

1. An OFDM receiving circuit for processing an OFDM signal, the circuit comprising:
   a low noise amplifier configured to amplify a received OFDM signal representing received data in an OFDM format; and
   a plurality of demodulation paths between the low noise amplifier and a combiner for combining data, wherein each of the plurality of demodulation paths includes an oversampled digital converter, a digital filter, and a demodulator, and is configured to receive an output signal of the low noise amplifier and to output demodulated data, wherein the OFDM signal comprises a plurality of bands each to include a plurality of OFDM sub-carriers, and each of the plurality of demodulation paths is configured to subject a down-converted OFDM signal from the low noise amplifier in a corresponding one of the plurality of bands to a respective oversampled digital converter, digital filter, and demodulator, and to output the demodulated data, wherein the combiner is configured to combine the demodulated data being outputted from the plurality of demodulation paths, to output the received data, and wherein a bandwidth of one of the plurality of bands nearest to a center frequency of the band of the OFDM signal is larger than that of one of the plurality of bands farthest from the center frequency.

2. The circuit in accordance with claim 1, comprising a single down-conversion mixer to down-convert an output signal of the low noise amplifier or a plurality of down-conversion mixers each in a corresponding one of the plurality of demodulation paths.

3. The circuit in accordance with claim 1, wherein said each of the plurality of demodulation paths comprises:
  a down-conversion mixer to down-convert the output signal of the low noise amplifier;
  an oversampling ADC to perform the oversampled digital conversion of an output of the down-conversion mixer;
  a digital filter to pass through the signal of an output signal of the oversampling ADC in the one of the plurality of bands corresponding to said each of the plurality of demodulation paths; and
  a demodulator to demodulate an output of the digital filter.

4. The circuit in accordance with claim 3, wherein an oversampling rate of the oversampling ADC is equal to or more than 2.

5. The circuit in accordance with claim 3, wherein the oversampling ADC comprises a sigma-delta ADC.

6. The circuit in accordance with claim 1, wherein said each of the plurality of demodulation paths comprises:
  a down-conversion mixer to down-convert the output signal of the low noise amplifier;
  an analog filter to pass through the OFDM signal from the down-conversion mixer;
  an oversampling ADC to perform the oversampled digital conversion of the OFDM signal from the analog filter;
  a digital filter to pass the signal of an output signal of the oversampling ADC in the one of the plurality of bands corresponding to said each of the plurality of demodulation paths; and
  a demodulator to demodulate an output of the digital filter.

7. The circuit in accordance with claim 6, wherein the analog filter comprises a passive RC filter.

8. The circuit in accordance with claim 1, further comprising an amplifier connected between a down-conversion mixer and the plurality of demodulation paths wherein the amplifier is configured to amplify the output signal of the down-conversion mixer to input to the plurality of demodulation paths.

9. An OFDM receiving method comprising:
  amplifying a received OFDM signal including received data encoded in an OFDM format;
  obtaining a plurality of first digital signals from the amplified OFDM signal, wherein the OFDM signal is divided into a plurality of OFDM bands, each of the plurality of OFDM bands including a plurality of OFDM sub-carriers, and each of the plurality of first digital signals is obtained by down-converting the amplified OFDM signal and subjecting a signal of the down-converted OFDM signal in one of the plurality of OFDM bands corresponding to each of the plurality of first digital signals to an oversampled digital conversion;
  digital filtering each of the plurality of first digital signals to obtain a plurality of respective filtered digital signals;
  demodulating the plurality of filtered digital signals to obtain a plurality of respective demodulated data; and
  combining the plurality of demodulated data to obtain a combined demodulated data corresponding to the received OFDM signal and that represents the received data,
  wherein a bandwidth of one of the plurality of bands nearest to a center frequency of the band of the OFDM signal is larger than that of one of the plurality of bands farthest to the center frequency.

10. The method in accordance with claim 9, further comprising:
  down-converting the amplified OFDM signal, wherein the oversampled digital conversion is carried out by a sigma-delta ADC.

* * * * *